(12) United States Patent
Hwang et al.

(10) Patent No.: US 12,404,593 B2
(45) Date of Patent: Sep. 2, 2025

(54) METHOD FOR MANUFACTURING TWO-DIMENSIONAL NANOSHEETS

(71) Applicant: Industry-Academic Cooperation Foundation, YONSEI UNIVERSITY, Seoul (KR)

(72) Inventors: Seong Ju Hwang, Seoul (KR); Xiaoyan Jin, Seoul (KR)

(73) Assignee: Industry-Academic Cooperation Foundation, YONSEI UNIVERSITY, Seoul (KR)

( * ) Notice: Subject to any disclaimer, the term of this patent is extended or adjusted under 35 U.S.C. 154(b) by 31 days.

(21) Appl. No.: 18/345,096

(22) Filed: Jun. 30, 2023

(65) Prior Publication Data

US 2024/0003024 A1   Jan. 4, 2024

(30) Foreign Application Priority Data

Jun. 30, 2022 (KR) .................. 10-2022-0080242
Jun. 15, 2023 (KR) .................. 10-2023-0077034

(51) Int. Cl.
*C01G 55/00* (2006.01)
*C25B 11/075* (2021.01)

(52) U.S. Cl.
CPC .......... *C25B 11/075* (2021.01); *C01G 55/004* (2013.01); *C01P 2002/02* (2013.01); *C01P 2002/72* (2013.01); *C01P 2004/03* (2013.01); *C01P 2004/04* (2013.01); *C01P 2004/24* (2013.01); *C01P 2004/64* (2013.01); *C01P 2006/40* (2013.01)

(58) Field of Classification Search
CPC . C01P 2002/02; C01P 2002/20; C01G 55/004
See application file for complete search history.

(56) References Cited

U.S. PATENT DOCUMENTS

2019/0273255 A1 * 9/2019 Ying ...................... C01G 51/04
2024/0254633 A1 * 8/2024 Du ........................ C25B 11/031

FOREIGN PATENT DOCUMENTS

WO   WO-2023119786 A1 *  6/2023   ............. C01G 55/00

OTHER PUBLICATIONS

Zhang et al., A generalized strategy for the synthesis of two-dimensional metal oxide nanosheets based on a thermoregulated phase transition, Nanoscale, 2019, 11, 3200-3207 (Year: 2019).*
Translation Copy of WO 2023119786 A1 (Year: 2023).*

* cited by examiner

*Primary Examiner* — Hoa (Holly) Le
(74) *Attorney, Agent, or Firm* — Bridgeway IP Law Group, PLLC; Jihun Kim

(57) ABSTRACT

Proposed is a two-dimensional nanosheet, which can significantly improve catalytic efficiency by realizing a two-dimensional nanosheet structure with a high specific surface area including a metal material having an amorphous crystal structure as an electrochemical catalyst to fully utilize the characteristics of a metal oxide catalyst material with excellent electrical conductivity and, at the same time, which is easy for mass synthesis in manufacturing method due to its relatively simple manufacturing process, and is easy to realize ultra-thin and large-area.

8 Claims, 7 Drawing Sheets

METHOD FOR MANUFACTURING TWO-DIMENSIONAL NANOSHEETS

CROSS REFERENCE TO RELATED APPLICATION

The present application claims priority to Korean Patent Application No. 10-2023-0077034, filed on Jun. 15, 2023 and No. 10-2022-0080242, filed on Jun. 30, 2022, the entire contents of which is incorporated herein for all purposes by this reference.

BACKGROUND OF THE INVENTION

Field of the Invention

The present disclosure relates to a two-dimensional nanosheet and a method for manufacturing the same, and more particularly, to a two-dimensional nanosheet and a method for manufacturing the same, which can significantly improve catalytic efficiency by increasing a specific surface area by realizing an electrochemical catalyst in the form of a two-dimensional metal oxide nanosheet having an amorphous structure, and, at the same time, which is easy for mass synthesis in manufacturing method due to its simple manufacturing process, and can maximize the utilization as an electrochemical catalyst due to their ability to realize ultra-thin films and large areas.

Description of the Related Art

As the world's population increases, the use of fossil fuels has continuously increased, and these fossil fuels cause problems such as depletion of reserves and emissions of substances that adversely affect global warming, such as carbon dioxide. Accordingly, research on an energy source to replace fossil fuels has been continued. Accordingly, hydrogen, which has a high energy density and is environmentally friendly, has been introduced as a substitute for fossil fuels. In order to produce such hydrogen in an eco-friendly manner, an electrochemical water decomposition reaction is important, and in particular, an oxygen evolution reaction (OER), which is the other reaction, is also one of the important processes to produce hydrogen.

Accordingly, it is necessary to develop a catalyst for oxygen evolution reaction with high reaction activity. As an oxygen evolution electrochemical catalyst material, iridium is mainly used, but it has the disadvantage of being expensive. Recently, various electrochemical catalysts have been studied. In particular, catalytic materials such as ruthenium oxide, cobalt oxide, and nickel oxide have been spotlighted as electrochemical catalysts that can replace iridium because they have excellent catalytic performance compared to other compounds and are less expensive than iridium. However, in the case of electrochemical metal oxide catalysts introduced so far, their utilization is limited due to the following problems.

First, $RuO_2$, $NiO$, $Co_3O_4$, $NiFe_2O_4$, $CoFe_2O_4$, and the like have been reported as metal oxide catalyst materials. When these catalyst materials are manufactured as electrochemical catalysts, they do not exhibit catalytic efficiency sufficient to replace iridium. More specifically, since electrochemical catalysts show activity mainly through surface reactions, studies that can increase the contact area with reactants, that is, a specific surface area, should be provided due to the nature of these catalytic reactions. However, most of the conventional electrochemical catalysts using the metal oxide catalytic material have no choice but to be manufactured in the form of 0-dimensional particles or 1-dimensional nanorods, so there is a problem that the excellent catalytic activity of the metal oxide catalytic material is not maximized and not fully utilized.

Second, in order to solve the above problems, an attempt has been made to improve the specific surface area by manufacturing an electrochemical catalyst having a two-dimensional nanosheet shape rather than a 0-dimensional particle or 1-dimensional nanorod/nanotube/nanofiber shape. However, these attempts have significant limitations in practical application due to complex experimental processes and difficulties in mass synthesis. In addition, even if the electrochemical catalyst using a metal oxide catalyst material is realized in the form of a two-dimensional nanosheet, the thickness of the nanosheet is inevitably manufactured to be tens of nm or more, and the size is also several nm or more, so there is a problem that it is difficult to realize ultra-thin nanosheets.

Third, all conventional studies using the metal oxide catalyst materials have a problem in maximizing catalyst efficiency by using them in the form of a crystalline metal. That is, in general, when a solid material is amorphized, constituent elements are randomly scattered, and orbital overlap between constituent elements may be weakened. This has the advantage of promoting the orbital overlap of the catalytic material and reactant in the catalytic reaction, so that the interaction occurs actively and eventually the catalytic performance can be maximized. However, studies on conventional catalysts using the metal oxide catalyst materials reported to date have limitations in terms of catalytic efficiency because they are all used in the form of crystalline metal oxides.

Accordingly, there is urgent need for research on electrochemical catalysts, which can be realized as a two-dimensional nanosheet with a high specific surface area so that the characteristics of a metal oxide catalyst material with excellent catalytic performance can be fully utilized, and which, at the same time, is easy for mass synthesis due to its simple manufacturing process, can realize an ultra-thin film with a large area, and further, can maximize the utilization of catalysts through metal oxide materials with an amorphous crystal structure.

SUMMARY OF THE INVENTION

The present disclosure has been devised to solve the above problems, and the object to be achieved by the present disclosure is to provide a two-dimensional nanosheet, which can realize a two-dimensional nanosheet structure with a high specific surface area including a material having an amorphous crystal structure as an electrochemical catalyst to fully utilize the characteristics of a metal oxide catalyst material with excellent electrical conductivity and catalytic activity and, at the same time, which is easy for mass synthesis in manufacturing method due to its simple manufacturing process, and is easy to realize ultra-thin and large-area.

The technical problem to be solved in the present disclosure are not limited to the above-mentioned technical problem, and any other technical problems not mentioned will be clearly understood from the following description by those skilled in the art.

In order to achieve the above object, the present disclosure provides a method for manufacturing a two-dimensional nanosheet comprising (1) preparing a metal oxide nanosheet precursor and (2) manufacturing a two-dimensional metal oxide nanosheet having an amorphous structure by heat-treating the metal oxide nanosheet precursor in a reducing atmosphere.

In addition, according to an embodiment of the present disclosure, the two-dimensional nanosheet has a rutile structure.

In addition, no holes penetrating the two-dimensional nanosheet is included.

In addition, in the step (2), the heat-treatment is performed at 100 to 500° C.

In addition, the metal oxide nanosheet precursor in the step (1) is derived from a metal selected from the group consisting of Re, V, Os, Ru, Ta, Jr, Nb, W, Ga, Mo, In, Cr, Rh, Mn, Co, and Fe, or alloys thereof.

In addition, the metal oxide nanosheet precursor has a layered structure laminated through hydrogen ions.

In addition, the reducing atmosphere in the step (2) is an argon gas atmosphere or a nitrogen gas atmosphere.

In addition, the argon gas atmosphere is the argon gas atmosphere of 50 to 100%.

In addition, according to an embodiment of the present disclosure, the two-dimensional nanosheet comprises a metal oxide of an amorphous structure, and conductivity is improved due to the amorphous structure.

In addition, the two-dimensional nanosheet may have a thickness of 0.01 to 10 nm.

In addition, the two-dimensional nanosheet may have a lateral size of 1 to 10,000 nm.

In addition, according to an embodiment of the present disclosure, the two-dimensional nanosheet may be the two-dimensional nanosheet manufactured according to the above manufacturing method.

In addition, the above-described two-dimensional nanosheet is used as an electrocatalyst in an oxygen evolution reaction (OER).

DETAILED DESCRIPTION OF THE INVENTION

Figure 1:
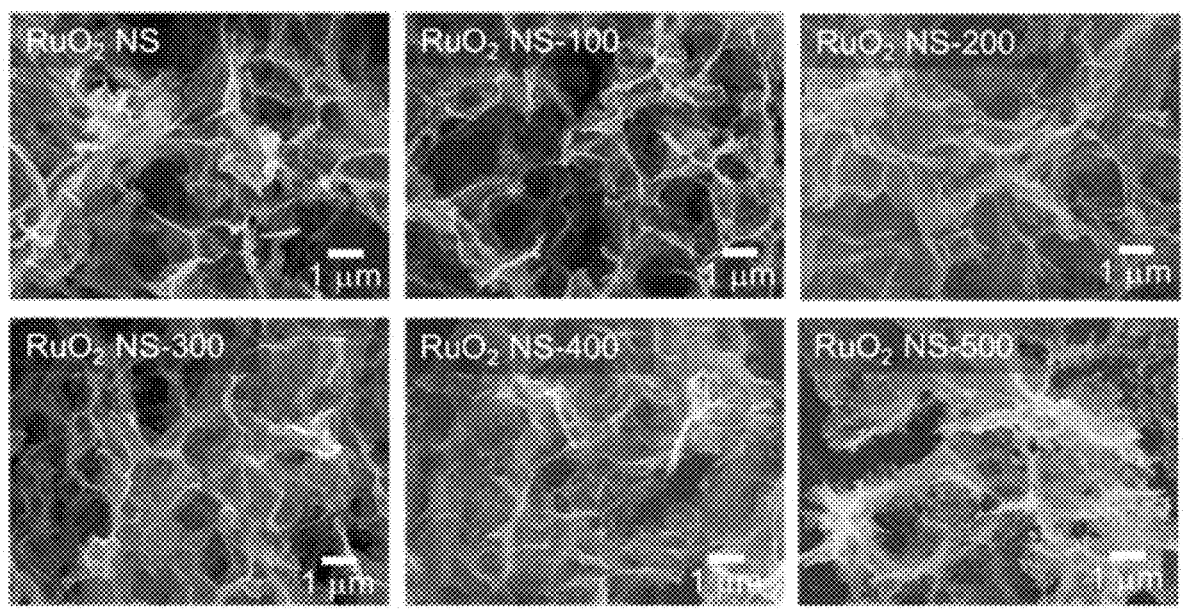
FIG. 1 is a SEM image showing a two-dimensional nanosheet according to the present disclosure.

The present disclosure will be described hereinafter with reference to the accompanying drawings. However, the present disclosure may be modified in various different ways, and the present disclosure is not limited to the described exemplary embodiments. Moreover, the part not related to the description will be omitted in order to clearly describe the present disclosure. Like reference numerals designate like elements throughout the specification.

Throughout the entire specification, when a part is connected (accessed, contacted, or coupled) with other parts, it includes "direct connection" as well as "indirect connection" in which the other member is positioned between the parts.

In addition, unless explicitly described to the contrary, the word "comprise" will be understood to imply the inclusion of stated elements but not the exclusion of any other elements.

The terminology used herein is for the purpose of describing particular example embodiments only and is not intended to be limiting of the present disclosure. The singular forms are intended to include the plural forms as well, unless the context clearly indicates otherwise. It should be further understood that the terms "comprises" and/or "having," when used in this specification, specify the presence of stated features, integers, steps, operations, elements, components or a combination thereof, but do not preclude the presence or addition of one or more other features, integers, steps, operations, elements, components, and/or combinations thereof.

Hereinafter, embodiments of the present disclosure will be described in detail with reference to the accompanying drawings.

In the present disclosure, "two-dimensional nanosheet" and "two-dimensional metal oxide nanosheet" have the same meaning.

As described above, conventional electrochemical catalysts including metal oxide catalytic materials have limitations in increasing specific surface area, complicated manufacturing process, difficulty in realizing ultra-thin films and large areas, and difficulty in maximizing catalytic efficiency due to the crystallinity of metal oxide catalyst materials. Therefore, as a catalyst material, there is a limit to practical use of conventional electrochemical catalysts.

Accordingly, in order to solve the above problems, the present disclosure provides a method for manufacturing a two-dimensional nanosheet comprising (1) preparing a metal oxide nanosheet precursor and (2) manufacturing a two-dimensional metal oxide nanosheet having an amorphous structure by heat-treating the metal oxide nanosheet precursor in a reducing atmosphere.

Through this, the present disclosure may realize a two-dimensional nanosheet structure having an amorphous crystal structure of an electrochemical catalyst, having a metal material, and having a high specific surface area so that the characteristics of a metal oxide catalyst material having excellent electrical conductivity can be fully utilized, thereby significantly improving the catalyst efficiency. Also, the present disclosure can perform mass production in manufacturing method due to its simple manufacturing process, and can maximize the utilization of the electrochemical catalyst since ultra-thin film and large area can be easily realized.

A two-dimensional nanosheet according to the present disclosure will be described below with reference to the accompanying drawings.

A method for manufacturing a two-dimensional nanosheet comprises (1) preparing a metal oxide nanosheet precursor and (2) manufacturing a two-dimensional metal oxide nanosheet having an amorphous structure by heat-treating the metal oxide nanosheet precursor in a reducing atmosphere.

The step (1) in the present disclosure is the step of preparing a metal oxide nanosheet precursor in order to utilize the excellent electrical conductivity of the metal oxide catalyst material.

In general, since ruthenium oxide catalyst materials have excellent electrical conductivity compared to other compounds, they are in the limelight as electrochemical catalysts that can replace platinum. Such a metal oxide catalyst material may be one or more selected from a metal selected from the group consisting of Re, V, Os, Ru, Ta, Jr, Nb, W, Ga, Mo, In, Cr, Rh, Mn, Co, and Fe, and an alloy thereof.

In one embodiment according to the present disclosure, the metal oxide catalyst material may include $RuO_2$, $MnO_2$, $Mn_3O_7$, $Mn_{1-x}Co_xO_2$ (0<x≤0.4), $VO_2$, $CoO_2$, $FeO_2$, $ReO_2$, $IrO_2$, $InO$, or a combination thereof, More preferably, the metal oxide catalyst material may be ruthenium oxide ($RuO_2$) having high conductivity and hydrophilicity.

As the step (1) of preparing the metal oxide nanosheet precursor using the metal oxide catalyst material, a commonly employed method for preparing a metal oxide nanosheet may be used as long as it meets the purpose of the present disclosure. As a non-limiting exemplary method, there is a method for preparing the metal oxide nanosheet precursor by sufficiently stirring the metal catalytic material, the oxide of the metal catalytic material, and a material containing sodium and heat-treating the mixture at a temperature of 600 to 1200° C. for 5 hours or more in an inert atmosphere such as a nitrogen atmosphere, an argon atmosphere, or vacuum to obtain sodium metal oxide, and then acid treating the sodium metal oxide to synthesize a hydrogen ion-substituted derivative, and then exfoliating the derivative in an aqueous solution.

Meanwhile, the metal oxide nanosheet precursor stacked through hydrogen ions may have a layered structure. According to a preferred embodiment of the present disclosure, when the metal oxide catalyst material is ruthenium oxide, the metal oxide nanosheet precursor may be a ruthenium oxide precursor and may have a layered structure of $RuO_2$—$RuO_2$.

Next, the step (2) is the step of manufacturing a two-dimensional metal oxide nanosheet having an amorphous structure by heat-treating the metal oxide nanosheet precursor in a reducing atmosphere.

In general, since electrochemical catalysts exhibit activity mainly through surface reactions, the catalytic efficiency can be maximized by increasing the contact area with the reactants, that is, the specific surface area, due to the nature of these catalytic reactions. However, conventional electrochemical catalysts using the metal oxide catalyst material can only be manufactured in the shape of 0-dimensional particles or 1-dimensional nanorods due to technical limitations, and it is difficult to manufacture a catalyst in the form of ultra-thin nanosheets.

In addition, the metal oxide catalyst material exhibits a tendency to agglomerate due to the nature of the particles, which may cause problems with reducing the accessible surface area and catalytic activity. In the case of manufacturing preparing an electrochemical catalyst by manufacturing a conventional metal oxide in nano size, there is also a problem that these materials do not sufficiently exhibit catalytic activity because they are not uniformly mixed.

Accordingly, the present disclosure solves the above problems by implementing an electrochemical catalyst in the form of a two-dimensional nanosheet capable of preventing agglomeration of nano-sized metal oxide particles and significantly increasing the specific surface area, and thus, can greatly improve catalytic efficiency.

Figure 2:
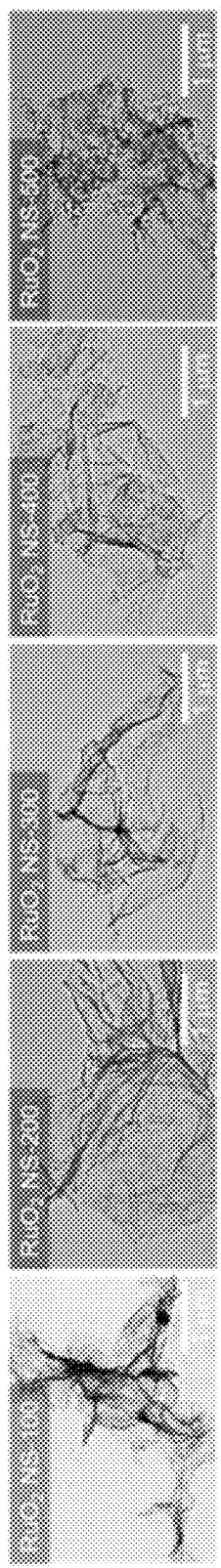
FIG. 2 is a TEM image showing a two-dimensional nanosheet according to the present disclosure.

More specifically, referring to FIGS. 1 and 2, when ruthenium oxide as a metal oxide nanosheet precursor is used according to a preferred embodiment of the present disclosure, it can be seen that a ruthenium oxide nanosheet having a two-dimensional structure is formed very thinly. However, in the case of ruthenium oxide nanosheets manufactured at 500° C., it can be seen that the particles constituting the nanosheets are agglomerated as shown in FIG. 2, indicating that the shape of the two-dimensional metal oxide nanosheets can be controlled according to the temperature conditions.

That is, since the electrochemical catalyst according to the present disclosure has a 2-dimensional nanosheet shape instead of a 0-dimensional particle or 1-dimensional nanorod shape, all constituent elements can participate in the reaction, so that the reaction specific surface area can be widened accordingly. Accordingly, the catalytic efficiency of the metal oxide catalytic material can be maximized.

To this end, the reducing atmosphere in the step (2) may be an argon gas atmosphere or a nitrogen gas atmosphere, the argon gas atmosphere may be an argon gas atmosphere of 50 to 100%. Also, the heat treatment may be performed at 100 to 500° C., more preferably, at 150 to 400° C., and most preferably at 200 to 350° C. Through the heat treatment, the metal oxide nanosheet precursor obtained in step (1) is oxidized to manufacture the metal oxide nanosheet.

In this case, if the heat treatment temperature is less than 100° C., the heat treatment temperature is too low, which may cause a problem that does not sufficiently phase transition the metal oxide nanosheet precursor obtained in the step (1). In addition, if the heat treatment temperature exceeds 500° C., there may be a problem in that the accessible surface area and the catalytic activity are greatly reduced due to agglomeration of the nanoparticles constituting the metal oxide nanosheet as described above.

Meanwhile, according to the present disclosure, it is possible to realize the two-dimensional metal oxide nanosheet shape as described above through the heat treatment conditions of step (2), and at the same time, it is possible to manufacture an ultra-thin film and large-area electrochemical catalyst. That is, conventionally, the thickness of metal oxide nanosheets used as electrochemical catalysts had to be manufactured to be thicker than several tens of nm, so an ultra-thin sheet structure could not be realized, and the size could only be manufactured with an area of about several nm. Therefore, there was a problem in that the catalyst efficiency could not be maximized due to limitations in improving the specific surface area.

Therefore, according to the present disclosure, an ultra-thin nanosheet and a large area can be realized through the heat treatment step, and at the same time, the electrochemical catalyst in the form of a two-dimensional metal oxide nanosheet can be manufactured to significantly improve catalytic efficiency.

More specifically, referring to FIG. 1, it can be seen that all of the electrochemical catalysts manufactured under different temperature conditions according to the present disclosure have a two-dimensional nanosheet shape. In addition, in the case of ruthenium oxide nanosheets synthesized at 100 to 400° C., compared to having an intact two-dimensional nanosheet shape, it can be seen that the nano sheet shape is maintained at a high heat treatment temperature of 500° C., but metal oxide particles start to appear and holes are generated on the surface. Likewise, referring to FIG. 2, it can be seen that a very thin nanosheet shape is maintained until the heat treatment temperature of 400° C., but that the particles are in the form of agglomerated nanosheets at the heat treatment temperature of 500° C.

Through this, in the two-dimensional nanosheet and manufacturing method thereof according to the present disclosure, the specific surface area is increased only when the specific heat treatment temperature condition is satisfied in the step (2), and the two-dimensional metal oxide nanosheet in which metal oxide particles are not agglomerated can be manufactured.

On the other hand, all conventional studies using the metal oxide catalyst materials have a problem in maximizing catalyst efficiency by using them in the form of a crystalline metal. That is, in general, in the case where a solid material is amorphized, constituent elements are randomly scattered, and orbital overlap between constituent elements is weakened. This has the advantage of promoting the orbital overlap of the catalytic material and reactant in the catalytic reaction, so that the interaction occurs actively and eventually the catalytic performance can be maximized. However, studies on conventional catalysts using the metal oxide catalyst materials reported so far have limitations in terms of catalyst efficiency because they are all used in the form of a crystalline metal.

In addition, the present disclosure can significantly improve catalytic efficiency by preparing an electrochemical catalyst in the form of a two-dimensional metal oxide nanosheet having an amorphous structure through the heat treatment step.

Figure 3:
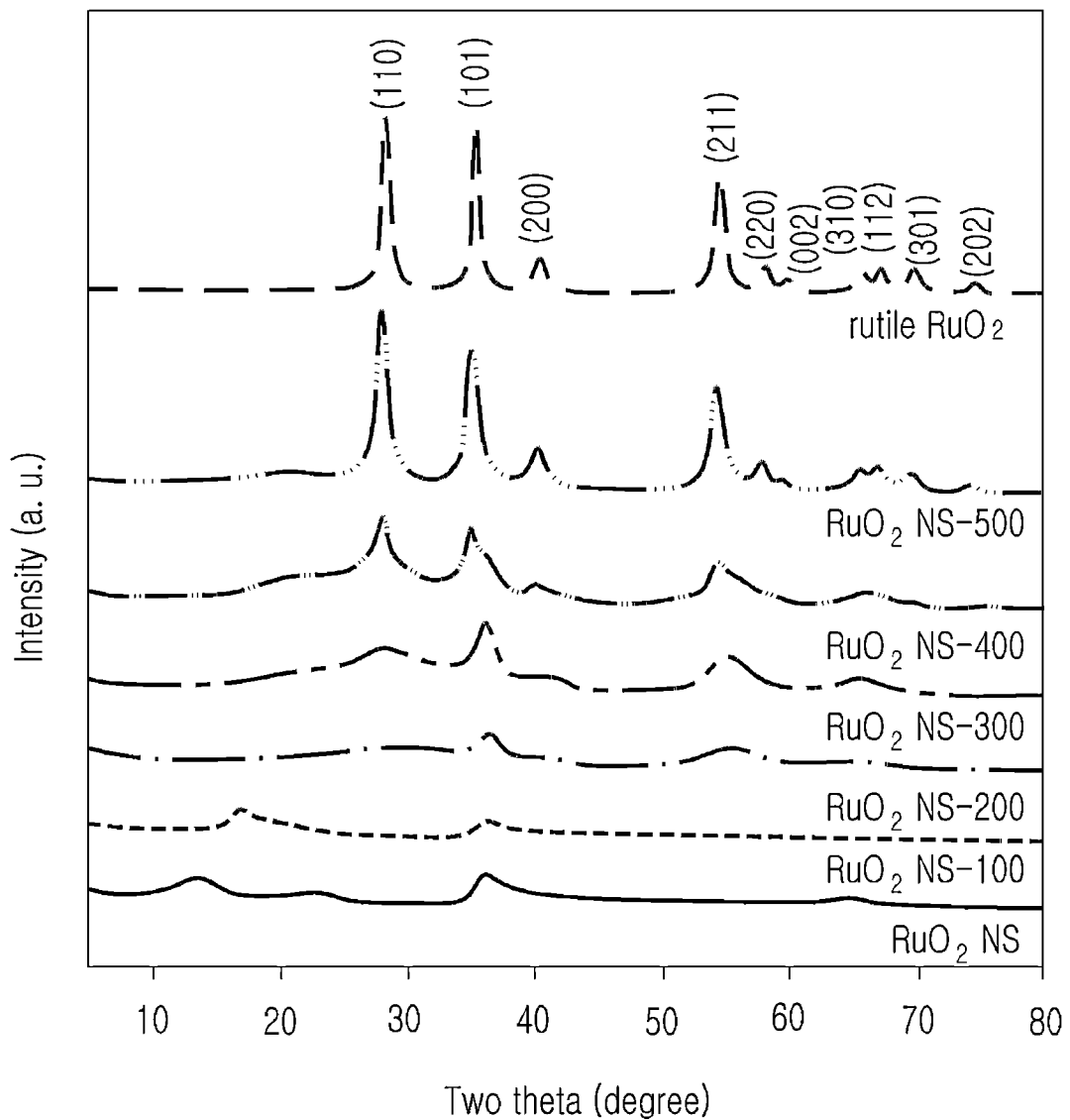
FIG. 3 is a graph showing results of analyzing an X-ray diffraction pattern of a two-dimensional nanosheet according to the present disclosure.

More specifically, referring to FIG. 3, it can be confirmed through the X-ray diffraction pattern of the electrochemical catalyst manufactured at different heat treatment temperatures according to the present disclosure that Examples in which the step (2) is performed at a heat treatment temperature of 100 to 300° C. have an amorphous crystal structure. In addition, it can be confirmed that a phase transition occurs to a rutile phase ruthenium oxide nanosheet having crystallinity from the heat treatment temperature of 400° C.

Figure 4A:
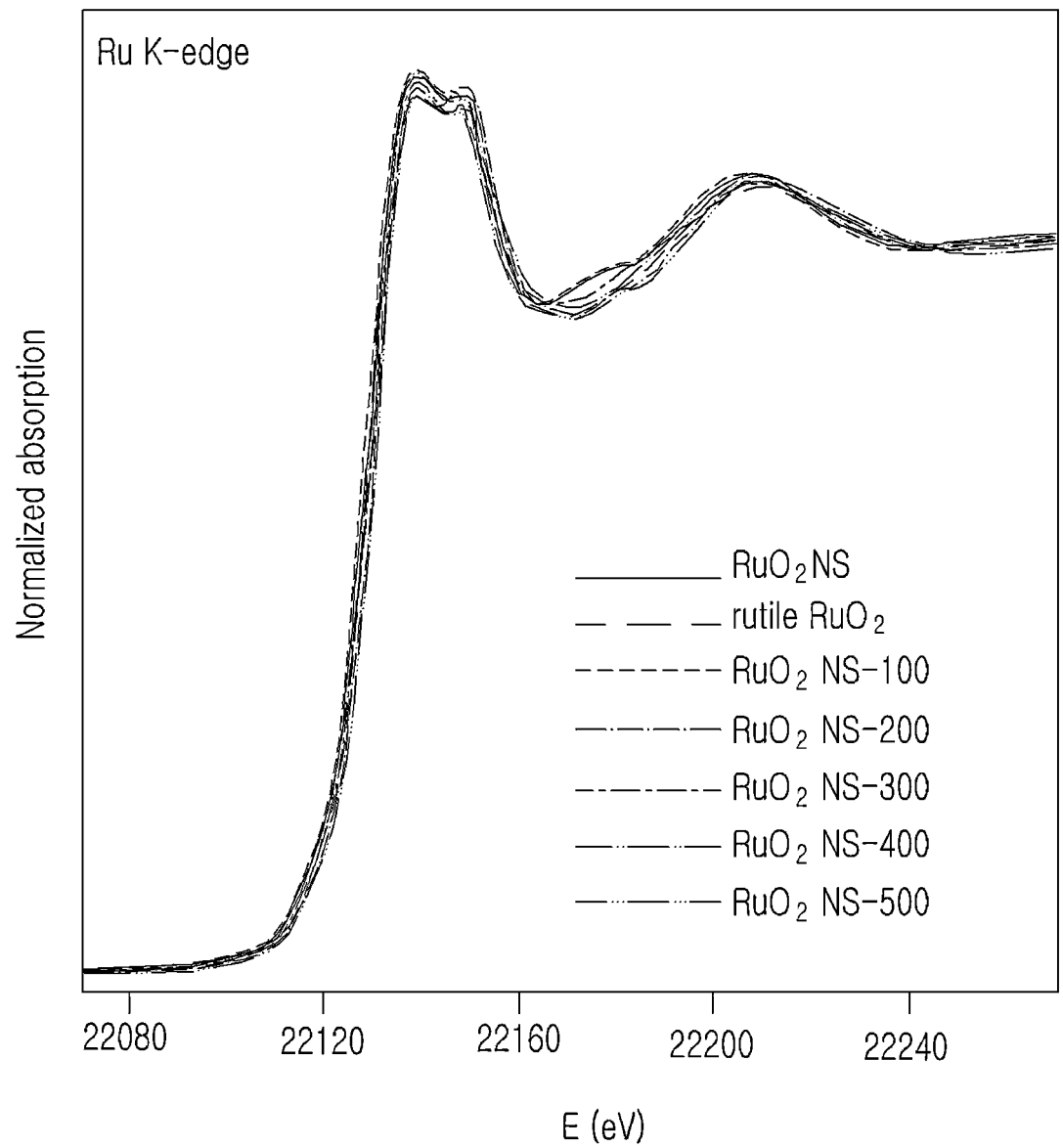
FIG. 4A-C is a graph showing XANES/EXAFS results of a two-dimensional nanosheet according to the present disclosure.
Figure 4B:
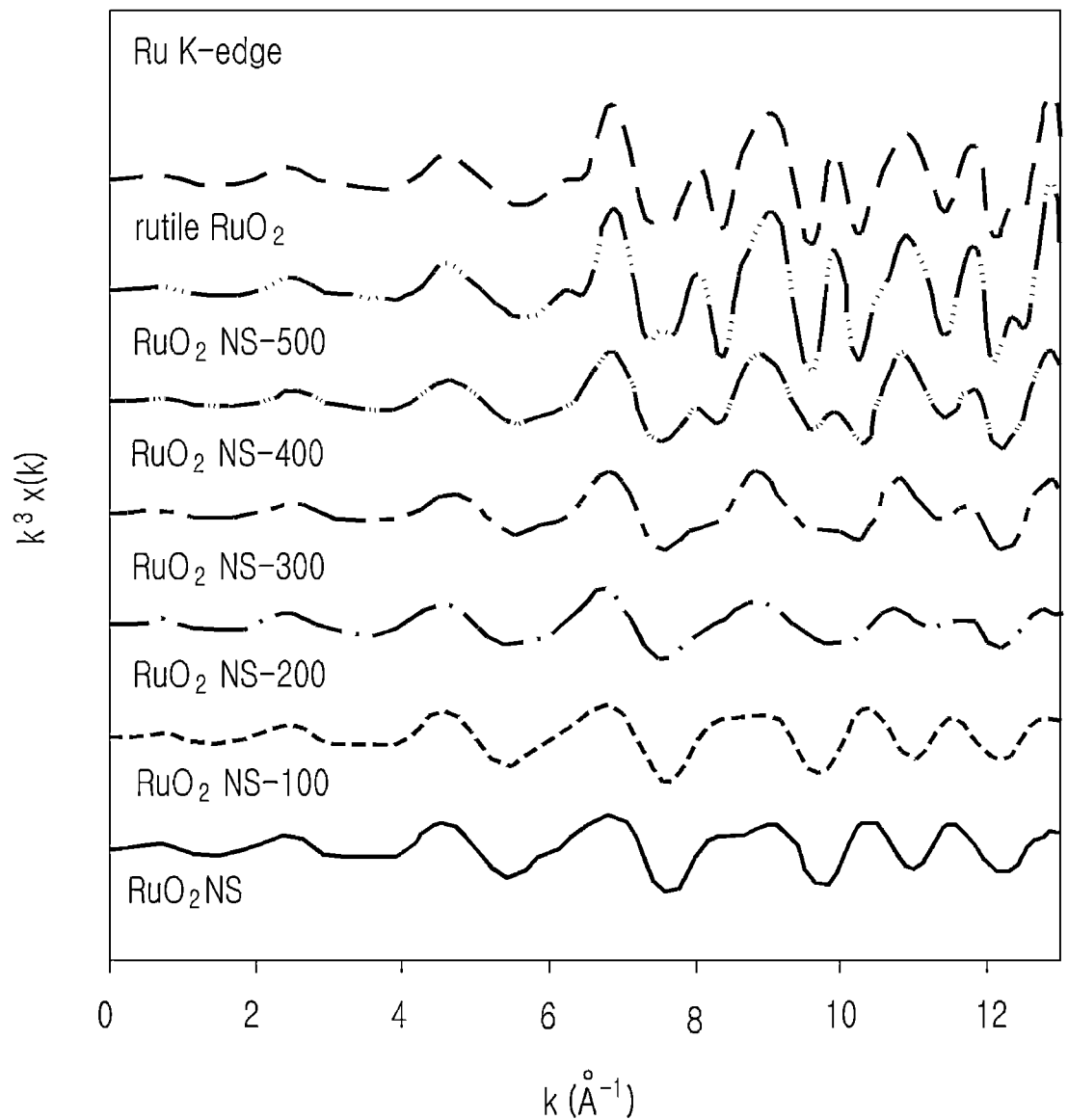
Figure 4C:
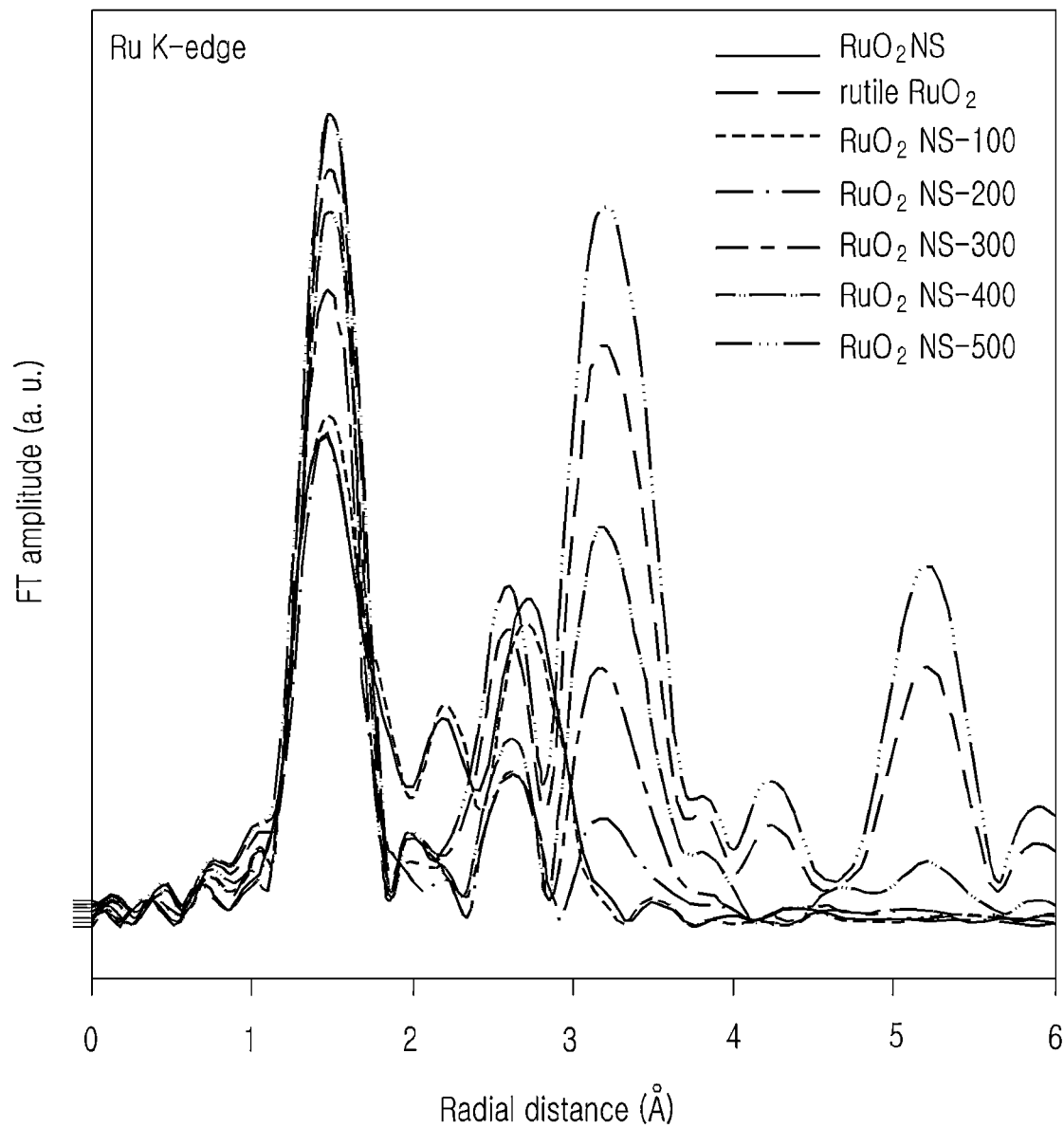

Meanwhile, referring to FIGS. 4A to 4C, from XANES and EXAFS analysis of the electrochemical catalyst manufactured by varying the heat treatment temperature according to the present disclosure, it can be found that the rutile structure, which could not be found at a temperature of less than 400° C. in FIG. 3, has a layered $RuO_2$ structure of a precursor at 100° C., but has a rutile structure over the entire temperature range from 200° C. $RuO_2$ has been found to have a rutile structure from the heat treatment temperature of 200° C. through EXAFS analysis although it has an amorphous structure in the X-ray diffraction pattern.

Through this, it can be seen that the two-dimensional nanosheet according to the present disclosure is in a state in which the constituent elements of the two-dimensional metal oxide nanosheet are randomly scattered, and the orbital overlap between constituent elements is weakened, promoting the orbital overlap between a catalytic material and a reactant in a catalytic reaction, thereby maximizing the catalytic performance.

As a result, the present disclosure can realize the two-dimensional nanosheet shape with an ultra-thin film and a large-area, which can maximize the specific surface area of an electrochemical catalyst through the heat treatment in an argon gas atmosphere in the step (2), and can maximize the efficiency of the catalyst by amorphizing the constituent elements of the two-dimensional metal oxide nanosheet. Furthermore, by solving the problems of conventional metal oxide nanosheets, which have complicated experimental processes and difficulties in mass synthesis, it is possible to manufacture the two-dimensional metal oxide nanosheet with excellent catalytic efficiency through a simple step of heat treatment under specific temperature conditions, resulting in greatly improved economic efficiency and usability.

Next, the two-dimensional nanosheet according to the present disclosure will be described. However, in order to avoid duplication, descriptions of parts having the same technical concept as the manufacturing method of the two-dimensional nanosheet are omitted.

More specifically, referring to FIG. 3, through the fact that the electrochemical catalyst including the amorphous two-dimensional metal oxide nanosheet according to the present disclosure does not have specific XRD Bragg reflection at the heat treatment temperature up to 300° C., it can be seen that a material having an amorphous structure was synthesized up to 300° C., and it had a rutile structure from 400° C. through comparison with commercial $RuO_2$. In addition, it can be seen that the electrochemical catalyst including the amorphous two-dimensional metal oxide nanosheet according to the present disclosure has an amorphous structure because it does not have a specific peak at 300° C.

Meanwhile, the two-dimensional metal oxide nanosheet according to the present disclosure may be derived from one or more selected from the group consisting of a metal selected from the group consisting of Re, V, Os, Ru, Ta, Ir, Nb, W, Ga, Mo, In, Cr, Rh, Mn, Co, and Fe, and alloys thereof. In addition, the two-dimensional nanosheet may be prepared to have a thickness of 0.01 to 10 nm, more preferably 0.01 to 1 nm. In addition, the size of the two-dimensional metal oxide nanosheet may also be realized in a large area of 1 to 10,000 nm, more preferably 100 to 10,000 nm.

In addition, the two-dimensional nanosheet according to the present disclosure may be used as a catalyst in an oxygen evolution reaction (OER).

Figure 5:
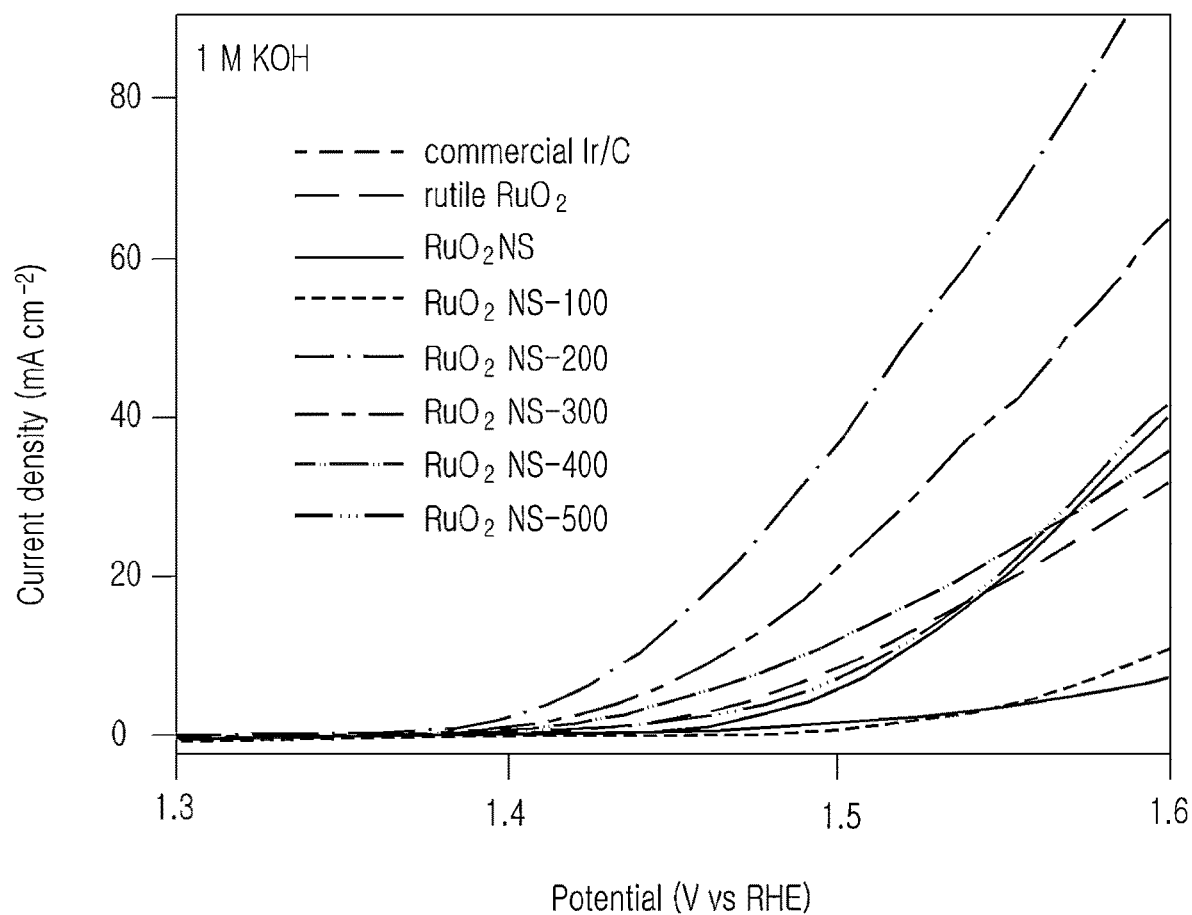
FIG. 5 is a graph showing the catalytic efficiency in an oxygen evolution reaction of a two-dimensional nanosheet according to the present disclosure.

More specifically, referring to FIG. 5, it can be seen that the two-dimensional ruthenium oxide nanosheet heat-treated at 200° C. has the most excellent activity as an oxygen evolution catalyst, and it may also be confirmed that it has significantly better catalytic activity than commercialized iridium-based catalysts.

Through this, the present disclosure can be realized as the two-dimensional nanosheet having a high specific surface area and an amorphous structure so that metal oxide catalyst materials with excellent electrical conductivity can be sufficiently used, and at the same time, the present disclosure can manufacture the electrochemical catalyst that can replace platinum by maximizing the utilization of the catalyst because the catalyst is easy to be synthesized in a large amount due to the simple manufacturing process and can implement an ultra-thin film and a large area.

Hereinafter, the present disclosure will be described in more detail through Examples, but the following Examples are not intended to limit the scope of the present disclosure, which should be interpreted to assist understanding of the present disclosure.

Example 1—Manufacturing of Electrochemical Catalyst (1) Preparation of Metal Oxide Nanosheet Precursor 0.476 g of $Na_2CO_3$(Company: Daejung), 0.897 g of $RuO_2$(Company: Alfa Aesar), and 0.227 g of Ru (Company: Alfa Aesar) were put in a mortar, ground to form a pellet, and then put into an alumina bottle. The alumina bottle was placed in a tube furnace, and reacted at 900° C. for 12 hours at a temperature rising rate of 100° C. per hour while flowing Ar gas into the tube furnace, followed by cooling to room temperature naturally. 100 ml of 1M $Na_2S_2O_8$(Company: Sigma Aldrich) was added per 1 g of the sample synthesized in a solid phase and reacted at room temperature for 72 hours. Thereafter, excess amount of $Na_2S_2O_8$ was washed off with distilled water and dried in an oven at 50° C. Then, 100 ml of 1M HCl (Company: Samchun) per 1 g of dry sample was added, and stirred while changing it every 3 days. Thereafter, 0.5 ml of 40 wt % TBAOH (Tetrabutylammonium hydroxide) (Company: Sigma Aldrich) and 125 ml of distilled water were added per 0.5 g of the sample obtained by washing and drying until neutralized with distilled water, and stirred at room temperature for 10 days. The synthesized solution was centrifuged and the precipitate was filtered to synthesize exfoliated $RuO_2$ nanosheets.

(2) Manufacturing of Two-Dimensional Metal Oxide Nanosheet

The two-dimensional ruthenium oxide nanosheets were manufactured by heat-treating the $RuO_2$ nanosheets obtained in the step (1) for 3 hours in a 99.99% Ar gas atmosphere at the temperature of 100° C.

Examples 2 to 7

The two-dimensional ruthenium oxide nanosheets were manufactured in the same manner as in Example 1, but the heat treatment was performed by changing the heat treatment temperature in the step (2) from 200 to 500° C.

TABLE 1

| 구분 | 명명 | (2)단계 열처리 온도 |
|---|---|---|
| 실시예1 | $RuO_2$ NS-100 | 100° C. |
| 실시예2 | $RuO_2$ NS-200 | 200° C. |
| 실시예3 | $RuO_2$ NS-300 | 300° C. |
| 실시예4 | $RuO_2$ NS-400 | 400° C. |
| 실시예5 | $RuO_2$ NS-500 | 500° C. |

Experimental Example 1—Oxygen Evolution Reaction (OER) Performance Measurement 2 mg of the electrochemical catalyst manufactured in Examples 1 to 5 was dissolved in ml of Milli-Q water and 0.2 ml of isopropanol (Company: KANTO) solution, and 20 μl of 5 wt % Nafion (Company: Sigma-Aldrich) solution was added and ultrasonicated (Company: JAC-3010). 10 μl of the dispersed solution was sampled on a Glassy Carbon (GC) electrode. Saturated calomel electrode (SCE) was used as a reference electrode and Pt wire was used as a counter electrode. The measurement was performed using a RRDE-3A Rotating Ring Disk Electrode Apparatus (Company: ALS) and an IVIUM analyzer to test the hydrogen generation reaction catalytic activity in a 1M KOH electrolyte in which $N_2$ was purged during the test, and the test was shown in FIG. 5.

Referring to FIG. 5, it can be seen that the two-dimensional ruthenium oxide nanosheets heat-treated at 200° C. have the most excellent activity as oxygen evolution catalysts, and also have significantly better catalytic activity compared to commercially available iridium-based catalysts.

Experimental Example 2—X-Ray Diffraction Pattern Analysis

The X-ray diffraction patterns of Examples 1 to 5 were analyzed (X-ray diffraction-company: Rigaku MiniFlex600) and shown in FIG. 3.

Referring to FIG. 3, it was confirmed from the X-ray diffraction pattern of the electrochemical catalyst according to the present disclosure manufactured by varying the heat treatment temperature that all of Examples in which step (2) was performed at a heat treatment temperature of 100 to 300° C. had the amorphous crystal structure.

Experimental Example 3—SEM Images

Scanning electron microscope images (Field Emission-Scanning Electron Microscopy-Company: JEOL JSM-7001F) were confirmed for Examples 1 to 5, and were shown in FIG. 1.

Experimental Example 4—TEM Images

Transmission electron microscopy (Company: JEOL F200) was confirmed for Examples 1 to 5 and shown in FIG. 2.

Referring to FIGS. 1 and 2, it can be seen that all the electrochemical catalysts manufactured under different temperature conditions according to the present disclosure have the two-dimensional nanosheet shape. In addition, compared to the nanosheet having an intact two-dimensional nanosheet form, in the ruthenium oxide nanosheets synthesized at 100 to 400° C., metal oxide particles begin to appear and holes are formed on the surface from 500° C., which is high heat treatment temperature, although the nanosheet shape is maintained. Similarly, referring to FIG. 2, it can be confirmed that a very thin nanosheet shape is maintained up to the heat treatment temperature of 400° C., but it can be seen that the nanosheet shape in which particles are agglomerated is formed from the heat treatment temperature of 500° C.

Experimental Example 5—XANES and EXAFS

For Examples 1 to 6 and Comparative Example 1, X-ray absorption near edge structure (XANES) and extended X-ray absorption fine structure (EXAFS) (Pohang Accelerator Laboratory) were measured, and the results were shown in FIG. 4.

Meanwhile, referring to FIGS. 4A to 4C, through XANES and EXAFS analysis of the electrochemical catalyst according to the present disclosure manufactured by varying the heat treatment temperature for the rutile structure, which could not be confirmed in FIG. 3, It can be seen that a layered $RuO_2$ structure, which is a precursor, appeared at the heat treatment temperature of 100° C., and a rutile structure appeared over the entire temperature range from 200° C.

As a result, it can be seen that the heat treatment temperature of 200° C., which produces an amorphous and rutile structure, is optimal for excellent catalytic activity.

The present disclosure can significantly improve catalytic efficiency by realizing a two-dimensional nanosheet structure including a metal oxide having an amorphous crystal structure and having a high specific surface area so as to fully utilize the characteristics of a metal oxide catalyst material with excellent electrical conductivity and catalytic performance, and at the same time, can perform mass production in manufacturing method due to its relatively simple manufacturing process, and can maximize the utilization of the electrochemical catalyst of the two-dimensional nanosheet since ultra-thin film and large area can be easily realized.

The effect of the present disclosure is not limited to the above-mentioned effects, and it should be understood to include all possible effects deduced from the configuration of the disclosure described in the detailed description or the claims of the present disclosure.

The description of the present disclosure is used for exemplification and those skilled in the art will be able to understand that the present disclosure can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present disclosure is represented by the claims to be described below rather than the detailed description, and it is to be interpreted that the meaning and scope of the claims and all the changes or modified forms derived from the equivalents thereof come within the scope of the present disclosure.

What is claimed is:

1. A method for manufacturing a two-dimensional nanosheet, the method comprising:
    preparing a metal oxide nanosheet precursor; and
    manufacturing a two-dimensional metal oxide nanosheet having an amorphous structure by heat-treating the metal oxide nanosheet precursor in a reducing atmosphere,
    wherein the two-dimensional metal oxide nanosheet includes $RuO_2$,
    wherein the heat-treating of the metal oxide nanosheet precursor includes forming a rutile structure of the two-dimensional metal oxide nanosheet including the $RuO_2$ at a temperature from 200° C. to 350° C.,
    wherein the metal oxide nanosheet precursor has a layered structure laminated through hydrogen ions,
    wherein the preparing of the metal oxide nanosheet precursor includes exfoliating the metal oxide nanosheet precursor having the layered structure laminated through the hydrogen ions.

2. The method of claim 1,
    wherein the reducing atmosphere in the manufacturing of the two-dimensional metal oxide nanosheet is an argon gas atmosphere or a nitrogen gas atmosphere.

3. The method of claim 2,
    wherein the argon gas atmosphere is of 50 to 100%.

4. A two-dimensional nanosheet manufactured according to the method of claim 1.

5. An electrochemical catalyst comprising the two-dimensional nanosheet of claim 4.

6. A two-dimensional nanosheet, comprising:
    a metal oxide having an amorphous structure and a rutile structure,
    wherein conductivity is improved due to the amorphous structure,
    wherein the two-dimensional nanosheet has a lateral size of 100 to 10,000 nm,
    wherein the metal oxide includes $RuO_2$.

7. The two-dimensional nanosheet of claim 6,
    wherein the two-dimensional nanosheet has a thickness of 0.01 to 10 nm.

8. An electrochemical catalyst comprising the two-dimensional nanosheet of claim 6.

* * * * *